United States Patent
Yoneyama

(10) Patent No.: US 12,440,967 B2
(45) Date of Patent: Oct. 14, 2025

(54) SIMULATION DEVICE

(71) Applicant: FANUC CORPORATION, Yamanashi (JP)

(72) Inventor: Hiroyuki Yoneyama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 53 days.

(21) Appl. No.: 18/558,309

(22) PCT Filed: Jul. 28, 2021

(86) PCT No.: PCT/JP2021/027920
§ 371 (c)(1),
(2) Date: Oct. 31, 2023

(87) PCT Pub. No.: WO2023/007621
PCT Pub. Date: Feb. 2, 2023

(65) Prior Publication Data
US 2024/0227174 A1 Jul. 11, 2024

(51) Int. Cl.
*B25J 9/16* (2006.01)
(52) U.S. Cl.
CPC .................. *B25J 9/1605* (2013.01)
(58) Field of Classification Search
CPC .................. B25J 9/1605; B25J 9/1671; G05B 2219/40323
See application file for complete search history.

(56) References Cited

U.S. PATENT DOCUMENTS

2005/0096892 A1* 5/2005 Watanabe .............. B25J 9/1671 703/7
2007/0213874 A1* 9/2007 Oumi ..................... B25J 9/1697 700/245

(Continued)

FOREIGN PATENT DOCUMENTS

JP 2005-135278 A 5/2005
JP 2006-010312 A 1/2006

(Continued)

OTHER PUBLICATIONS

International Search Report issued in PCT/JP2021/027920; mailed Oct. 19, 2021.

*Primary Examiner* — Dale Moyer
(74) *Attorney, Agent, or Firm* — Studebaker Brackett PLLC

(57) ABSTRACT

Provided is a simulation device capable of efficiently adjusting the position of a visual sensor model. The simulation device includes: a virtual space generation unit that generates a virtual space three-dimensionally representing a work space; a measurement target model arrangement unit that arranges in the virtual space a measurement target model three-dimensionally representing a measurement target; a measurement portion specification unit that specifies a measurement portion in the measurement target model; a visual sensor model arrangement unit that arranges the visual sensor model three-dimensionally representing a visual sensor for imaging the measurement target, at an arbitrary visual sensor model position; and a position determination unit that determines, on the basis of the position of the measurement portion, the visual sensor model position included in an image size of the visual sensor model as an arrangement position of the visual sensor model.

10 Claims, 18 Drawing Sheets

(56) References Cited

U.S. PATENT DOCUMENTS

| | | | | |
|---|---|---|---|---|
| 2008/0013825 A1* | 1/2008 | Nagatsuka | ......... | G05B 19/4069 382/153 |
| 2015/0209963 A1* | 7/2015 | Atohira | ................. | B25J 9/1697 901/47 |
| 2015/0261899 A1* | 9/2015 | Atohira | ................. | B25J 9/1671 703/7 |
| 2019/0385329 A1* | 12/2019 | Fujii | ..................... | B25J 9/1671 |
| 2021/0023718 A1* | 1/2021 | Yoneyama | ............. | B25J 9/1671 |

FOREIGN PATENT DOCUMENTS

| JP | 2008-021092 A | 1/2008 |
|---|---|---|
| JP | 2011-065399 A | 3/2011 |
| JP | 2015-136781 A | 7/2015 |

* cited by examiner

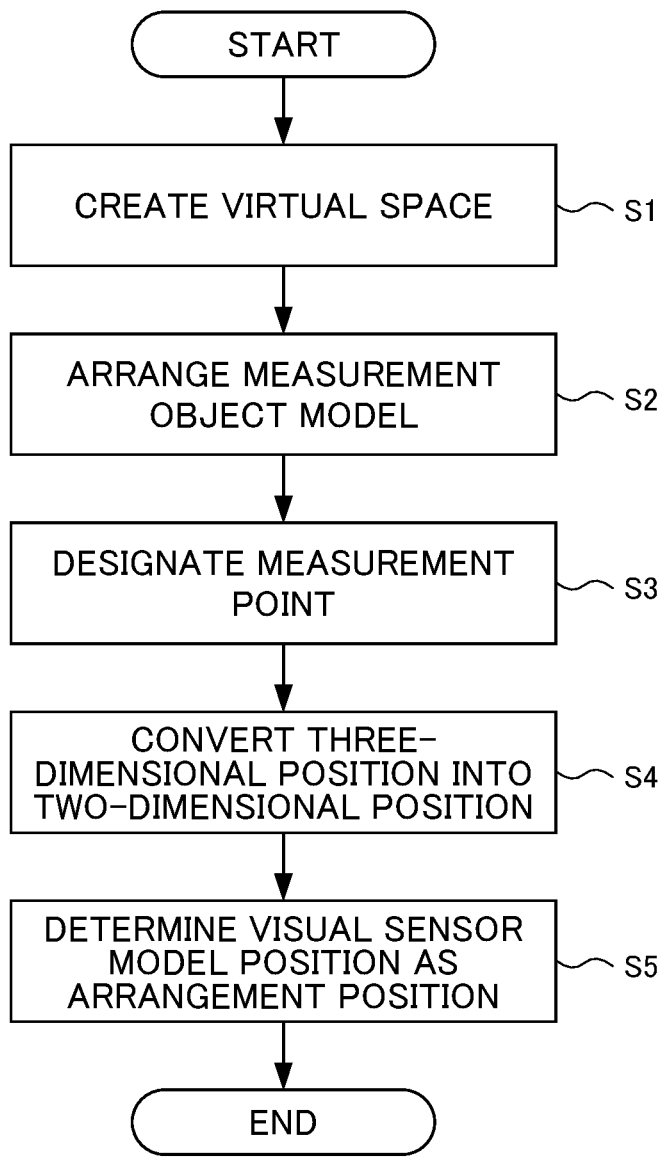

SIMULATION DEVICE

TECHNICAL FIELD

The present invention relates to a simulation device.

BACKGROUND ART

Conventionally, a technique for simulating an operation of performing an operation on a measurement object model by a robot model has been proposed (for example, see Patent Document 1). A simulation device disclosed in Patent Document 1 arranges a robot model of a robot, a visual sensor model of a visual sensor, and a measurement object model of a measurement object in a virtual space in which a work space is represented three-dimensionally, measures the measurement object model using the visual sensor model, and simulates an operation of performing an operation on the measurement object model using the robot model.

CITATION LIST

Patent Document

Patent Document 1: Japanese Unexamined Patent Application, Publication No. 2008-21092

DISCLOSURE OF THE INVENTION

Problems to be Solved by the Invention

In the conventional technology, a measurement object model is measured by a visual sensor model in a virtual space, and simulation in which a robot model performs an operation on the measurement object model can be performed. However, the operator has to determine an appropriate position of the visual sensor model while watching an image obtained by imaging the measurement object model using the visual sensor model. Therefore, time and labor are required for adjusting the position of the visual sensor model.

Therefore, there is a need for a simulation device capable of efficiently adjusting the position of a visual sensor model.

Means for Solving the Problems

A simulation device according to one aspect of the present disclosure includes: a virtual space creation unit that creates a virtual space representing a work space three-dimensionally; a measurement object model arrangement unit that arranges a measurement object model representing a measurement object three-dimensionally in the virtual space; a measurement point designation unit that designates a measurement point in the measurement object model; a visual sensor model arrangement unit that arranges a visual sensor model representing three-dimensionally a visual sensor that images the measurement object, at an arbitrary visual sensor model position; and a position determination unit that determines the visual sensor model position included in an image size of the visual sensor model as an arrangement position of the visual sensor model based on a position of the measurement point.

A simulation device according to another aspect of the present disclosure includes a control unit configured to perform: designating a measurement point in a measurement object model representing an object three-dimensionally in a virtual space representing a work space three-dimensionally; receiving an input operation for arranging a visual sensor model representing a visual sensor for imaging the measurement object three-dimensionally at an arbitrary visual sensor model position; and receiving an input operation for determining the visual sensor model position included in an image size of the visual sensor model as an arrangement position of the visual sensor model.

Effects of the Invention

According to the present invention, it is possible to efficiently adjust the position of a visual sensor model.

BRIEF DESCRIPTION OF THE DRAWINGS

FIG. 20 is a flowchart showing processing of the simulation device according to the present embodiment.

PREFERRED MODE FOR CARRYING OUT THE INVENTION

Figure 1:
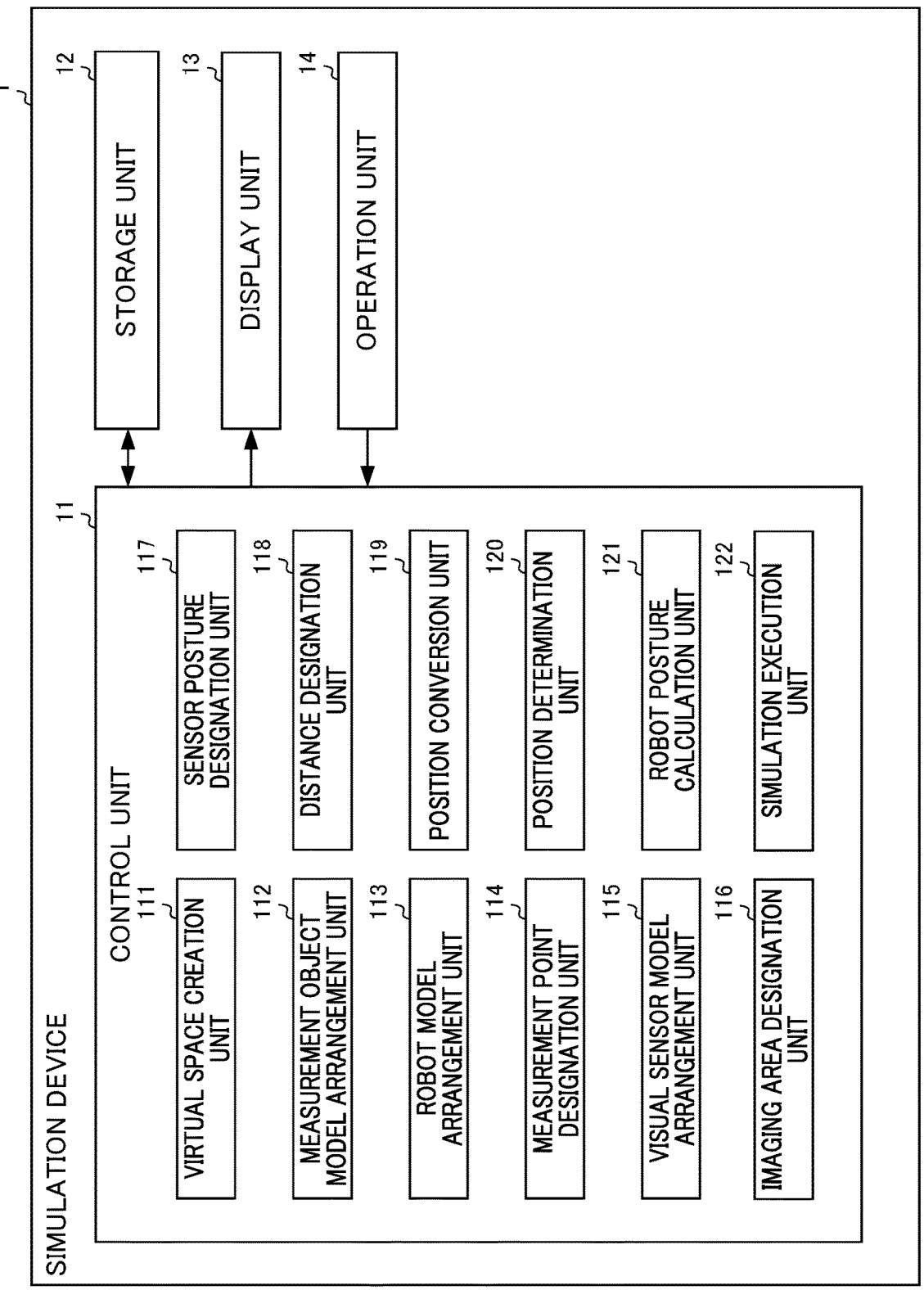
FIG. 1 is a block diagram showing the configuration of a simulation device according to the present embodiment.

Hereinafter, an example of an embodiment of the present invention will be described. FIG. 1 is a block diagram showing a configuration of a simulation device 1 according to the present embodiment. As shown in FIG. 1, a simulation device 1 includes a control unit 11, a storage unit 12, a display unit 13, and an operation unit 14.

The control unit 11 is a processor such as a CPU (Central Processing Unit), and realizes various functions by executing programs stored in the storage unit 12.

The storage unit 12 is a storage device such as ROM (Read Only Memory) for storing an OS (Operating System), application programs, and the like, RAM (Random Access Memory), a hard disk drive for storing various other information, or a SSD (Solid State Drive).

The display unit 13 includes a liquid crystal display (LCD), a cathode ray tube (CRT), and the like, and displays various images. The operation unit 14 includes a mouse, a keyboard, and the like, and receives various inputs.

The control unit 11 includes a virtual space creation unit 111, a measurement object model arrangement unit 112, a robot model arrangement unit 113, a measurement point designation unit 114, a visual sensor model arrangement unit 115, an imaging area designation unit 116, a sensor posture designation unit 117, a distance designation unit 118, a position conversion unit 119, a position determination unit 120, a robot posture calculation unit 121, and a simulation execution unit 122.

The virtual space creation unit 111 creates a virtual space representing a work space three-dimensionally. The measurement object model arrangement unit 112 arranges or places a measurement object model representing the measurement object three-dimensionally in the virtual space.

The robot model arrangement unit 113 arranges or places a robot model representing a robot three-dimensionally in the virtual space. The measurement point designation unit 114 designates or specifies one or more measurement points in the measurement object model. The measurement point designation unit 114 designates one or more arbitrary measurement points in the measurement object model, for example, in accordance with an operation of the operation unit 14.

The visual sensor model arrangement unit 115 arranges or places a visual sensor model representing three-dimensionally a visual sensor that images a measurement object, at an arbitrary visual sensor model position. The visual sensor model arrangement unit 115 can change the visual sensor model position of the visual sensor model to an arbitrary position, for example, in accordance with an operation of the operation unit 14.

The imaging area designation unit 116 designates or specifies, for example, an area in which a measurement point is imaged by the visual sensor model within the image size of the visual sensor model in accordance with an operation of the operation unit 14. The sensor posture designation unit 117 designates or specifies, for example, a posture when the visual sensor model is disposed above the measurement point in accordance with an operation of the operation unit 14. The distance designation unit 118 designates or specifies, for example, a distance between the visual sensor model and the measurement point in accordance with an operation of the operation unit 14.

The position conversion unit 119 converts the three-dimensional position of the measurement point in the visual sensor model position into a two-dimensional position when the measurement point is imaged by the visual sensor model. The position determination unit 120 determines the visual sensor model position included in the image size of the visual sensor model as the arrangement position of the visual sensor model based on the position of the measurement point.

When the visual sensor model is attached to the robot model, the robot posture calculation unit 121 calculates the posture of the robot model at the visual sensor model position.

The simulation execution unit 122 uses the robot model, the visual sensor model, and the measurement object model to execute a simulation in which the robot model performs an operation on the measurement object model based on the operation program.

First Embodiment

Figure 2:
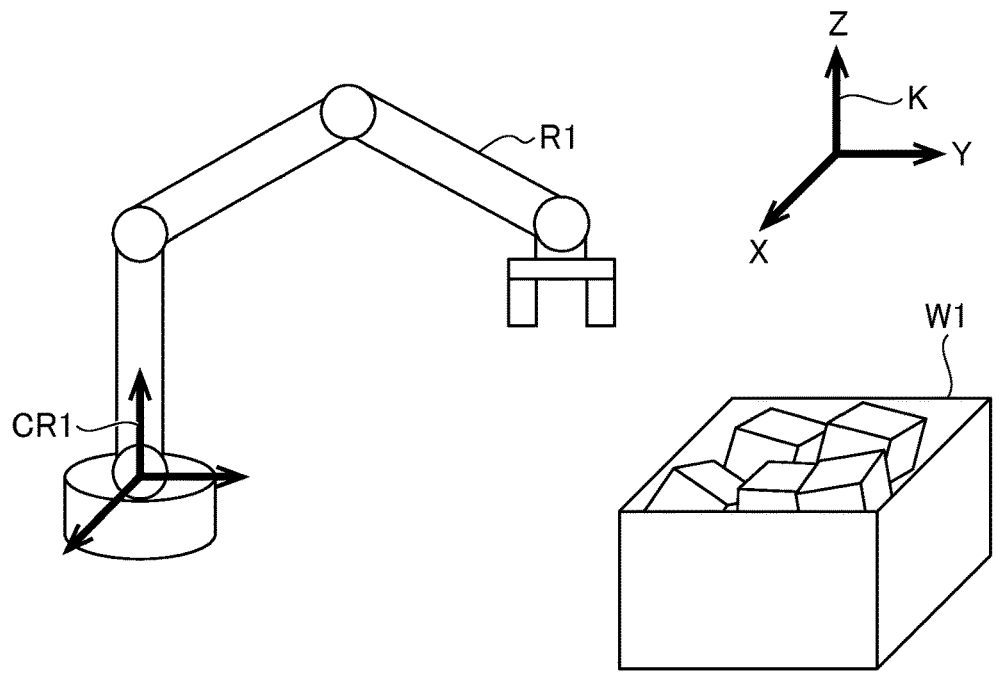
FIG. 2 is a diagram showing a robot model, a visual sensor model, and a measurement object model in a virtual space according to a first embodiment.

FIGS. 2 to 10 are diagrams showing processing of the simulation device 1 according to the first embodiment. FIG. 2 is a diagram showing a robot model R1, a visual sensor model V1, and a measurement object model W1 in a virtual space according to the first embodiment.

As shown in FIG. 2, the virtual space creation unit 111 creates a virtual space representing a work space three-dimensionally. Then, the measurement object model arrangement unit 112 arranges the measurement object model W1 representing the measurement object three-dimensionally in the virtual space. The measurement object model W1 may be, for example, a plurality of workpieces accommodated in a box. The reference coordinate system K represents a coordinate system serving as a reference in the virtual space.

Further, the robot model arrangement unit 113 arranges the robot model R1 representing the robot three-dimensionally in the virtual space. The robot model coordinate system CR1 represents a coordinate system of the robot model R1. The robot model R1 may be, for example, a multi-joint robot.

Figure 3:
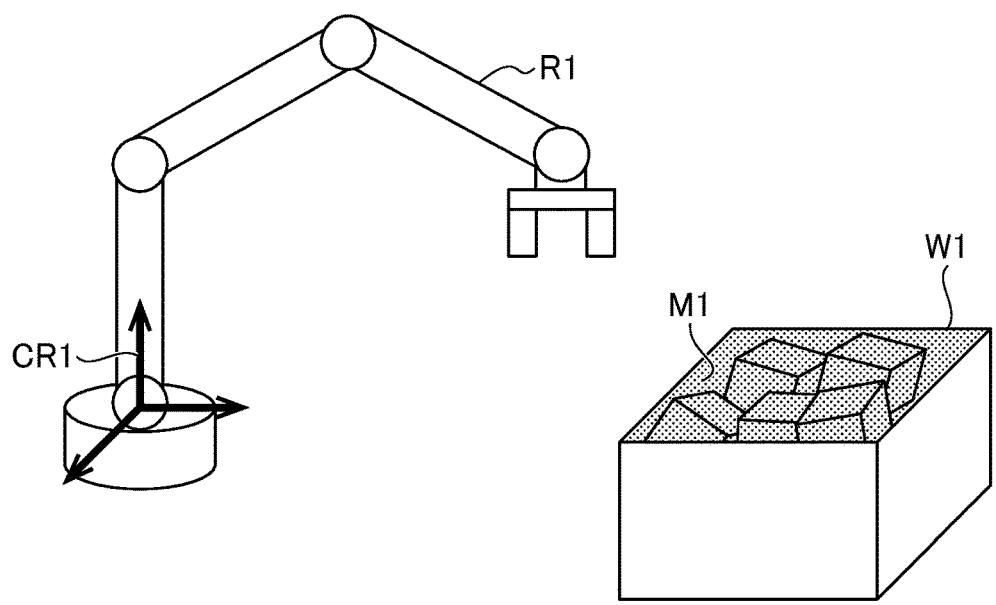
FIG. 3 is a diagram showing processing of designating a measurement point.

FIG. 3 is a diagram showing processing of designating a measurement point M1. As shown in FIG. 3, the measurement point designation unit 114 designates a measurement point M1 in the measurement object model W1. In the example shown in FIG. 3, the measurement point designation unit 114 designates the upper surface of the measurement object model W1 as the measurement point M1.

For example, when the measurement object model W1 is a workpiece, the measurement point designation unit 114 designates the measurement point M1 by surrounding the entire workpiece or a portion of the workpiece with a rectangular parallelepiped. When the measurement object model W1 is a basket or a container, the measurement point designation unit 114 designates the measurement point M1 by selecting the upper surface of the measurement object model W1.

Figure 4:
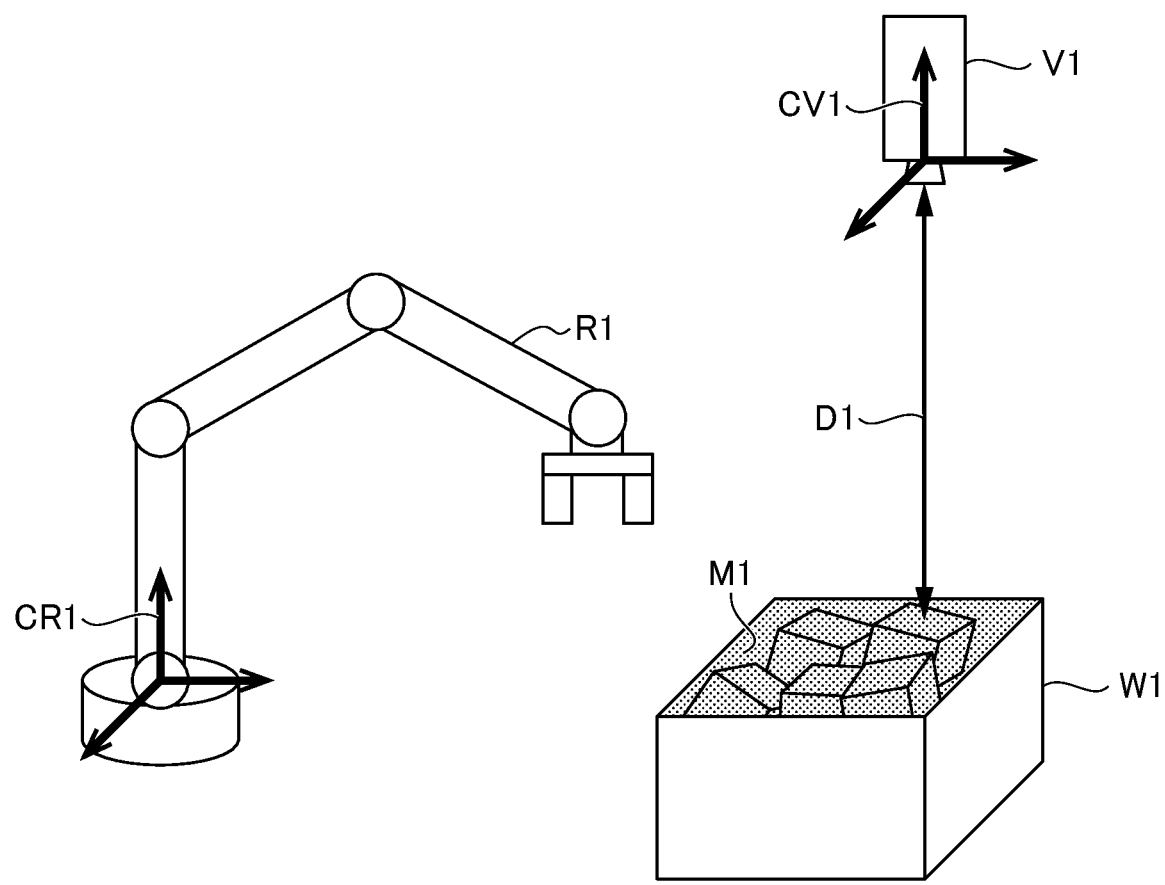
FIG. 4 is a diagram showing processing of arranging a visual sensor model.

FIG. 4 is a diagram showing processing of arranging the visual sensor model V1. As shown in FIG. 4, the visual sensor model arrangement unit 115 arranges the visual sensor model V1 at one or more arbitrary visual sensor model positions above the measurement point M1.

The distance designation unit 118 designates a distance D1 between the visual sensor model V1 and the measurement point M1. For example, the distance designation unit 118 designates the distance D1 by designating a fixed distance or designating a range of distances in accordance with an operation of the operation unit 14.

Figure 5:
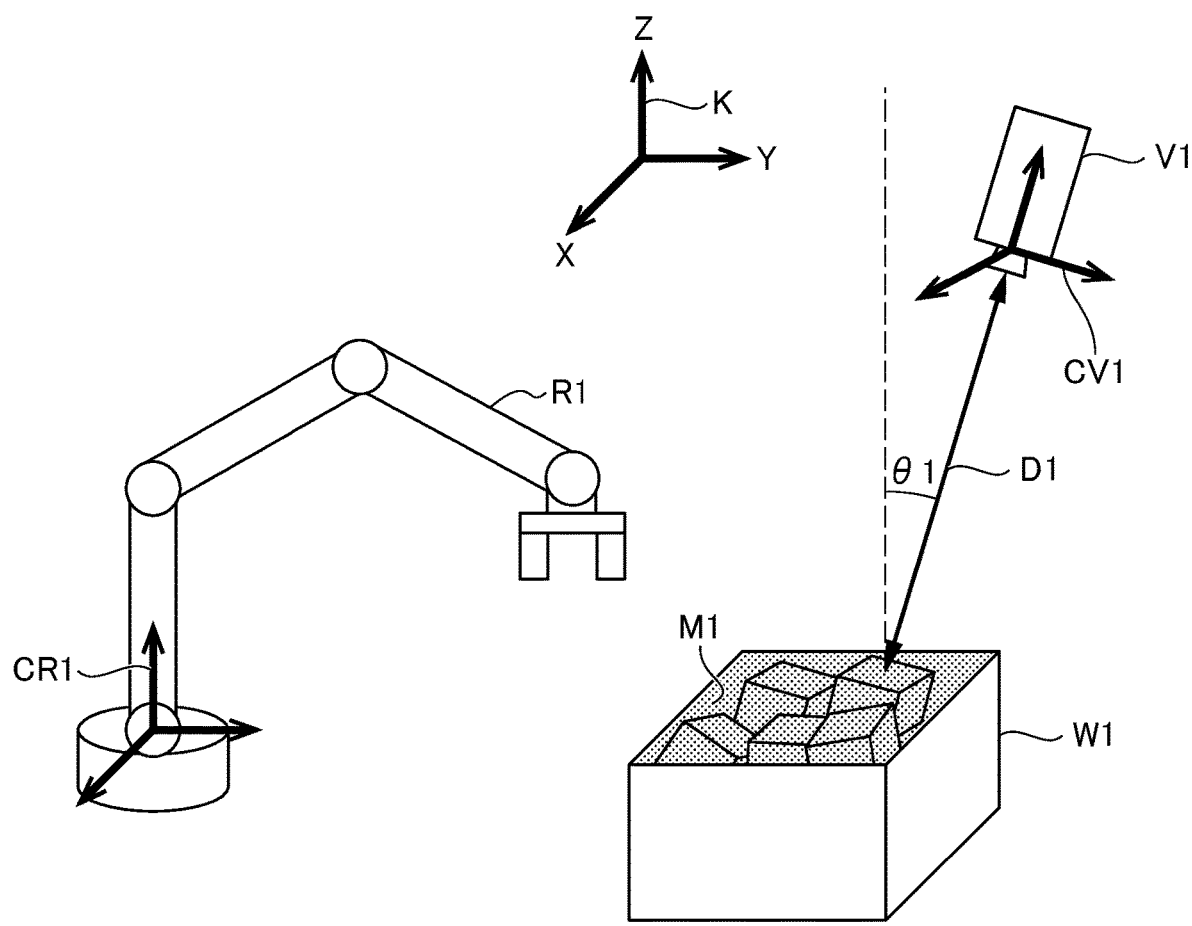
FIG. 5 is a diagram showing processing of designating the posture of the visual sensor model.

FIG. 5 is a diagram showing processing of designating the posture of the visual sensor model V1. As shown in FIG. 5, the sensor posture designation unit 117 designates a posture when the visual sensor model V1 is disposed above the measurement point M1.

Specifically, the sensor posture designation unit 117 designates the angle θ1 around the visual sensor model coordinate system CV1 based on or with reference to the posture in which the optical axis of the visual sensor model V1 is perpendicular to the reference plane of the virtual space (for example, the XY plane of the virtual space) (that is, the posture of the visual sensor model V1 in FIG. 4). The processing of designating the posture of the visual sensor model V1 may be omitted when it is not necessary to designate the posture of the visual sensor model V1.

Figure 6:
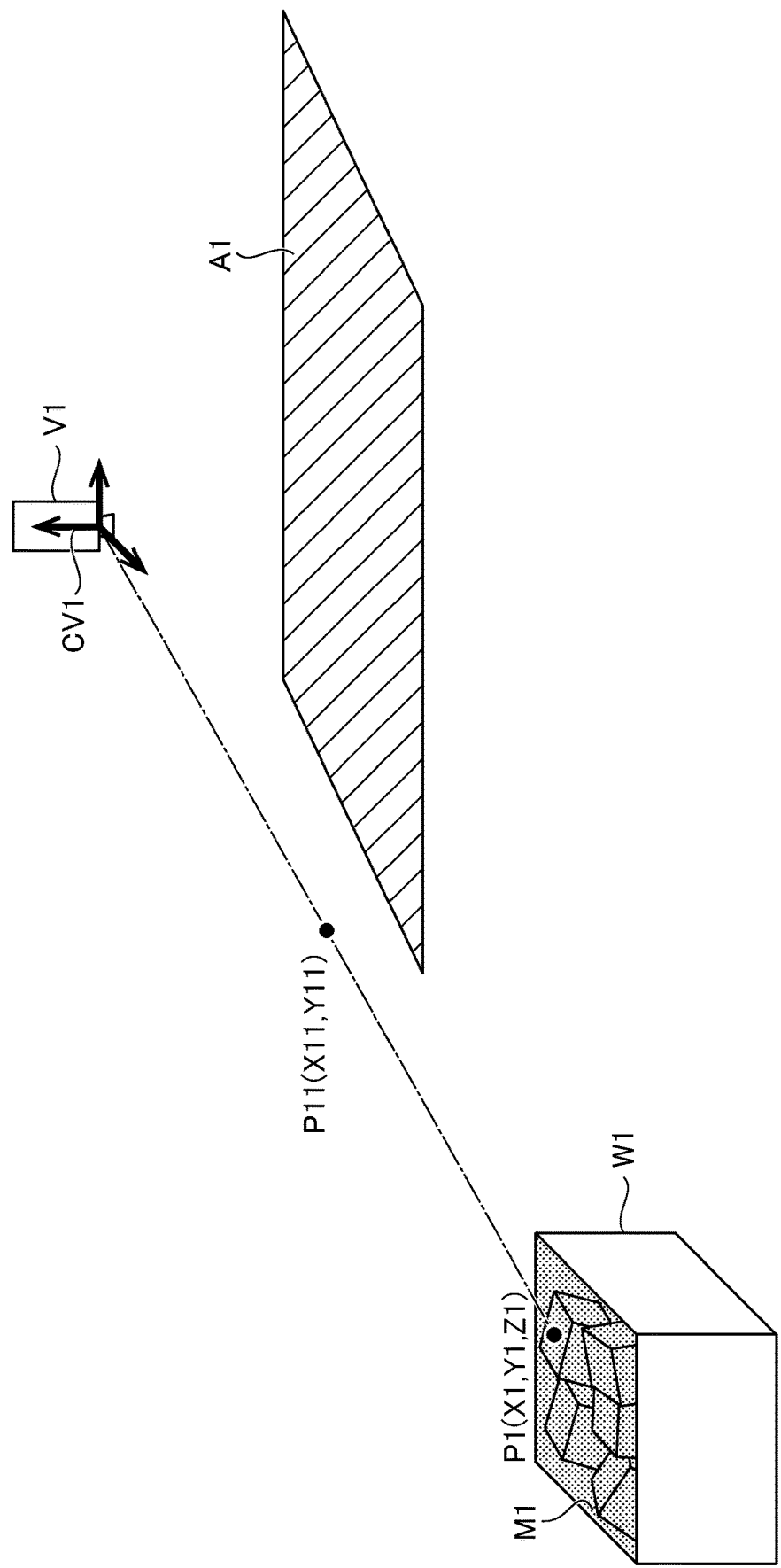
FIG. 6 is a diagram showing processing of converting a three-dimensional position of a measurement point into a two-dimensional position.
Figure 7:
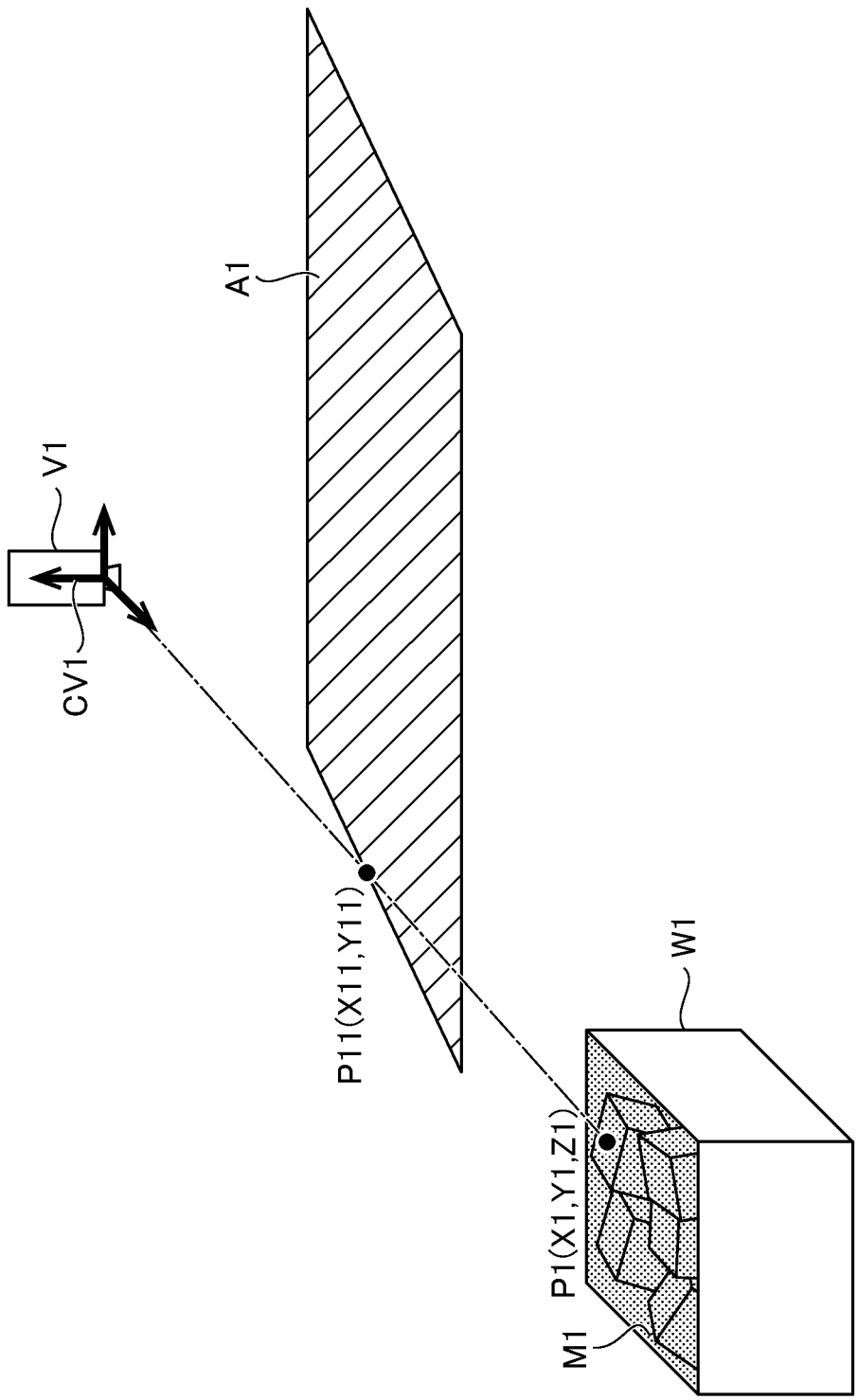
FIG. 7 is a diagram showing processing of converting a three-dimensional position of a measurement point into a two-dimensional position.

FIGS. 6 and 7 are diagrams showing processing of converting the three-dimensional position P1 of the measurement point M1 into the two-dimensional position P11. As shown in FIGS. 6 and 7, the three-dimensional position P1 of the measurement point M1 is represented as coordinates (X1, Y1, Z1) in the reference coordinate system K in the virtual space.

Then, the position conversion unit 119 converts the three-dimensional position P1 (X1, Y1, Z1) of the measurement point M1 at the visual sensor model position of the visual sensor model V1 into the two-dimensional position P11 (X11, Y11) when the measurement point M1 is imaged by the visual sensor model V1.

Specifically, the position conversion unit 119 converts the three-dimensional position P1 of the measurement point into the two-dimensional position P11 when the measurement point is imaged by the visual sensor model V1, using the imaging conditions including the visual sensor model position of the visual sensor model V1, the focal length of the lens of the visual sensor model V1, the length per pixel of the imaging element of the visual sensor model V1, and the center position of the lens of the visual sensor model V1. The imaging conditions may include other conditions relating to the visual sensor model V1.

When the visual sensor model position of the visual sensor model V1 is changed to an arbitrary position by the visual sensor model arrangement unit 115, the position conversion unit 119 converts the three-dimensional position P1 (X1, Y1, Z1) of the measurement point into the two-dimensional position P11 (X11, Y11) at the changed visual sensor model position.

That is, the simulation device 1 repeats the conversion of the three-dimensional position P1 into the two-dimensional position P11 by the position conversion unit 119 while changing the visual sensor model position arranged by the visual sensor model arrangement unit 115 in response to an input operation performed by the user on the operation unit 14.

Further, as shown in FIGS. 6 and 7, the position determination unit 120 determines whether the converted two-dimensional position P11 is included in the image size A1 of the visual sensor model V1. In the example shown in FIG. 6, the position determination unit 120 determines that the converted two-dimensional position P11 is not included in the image size A1 of the visual sensor model V1. On the other hand, in the example shown in FIG. 7, the position determination unit 120 determines that the converted two-dimensional position P11 is included in the image size A1 of the visual sensor model V1.

Figure 8:
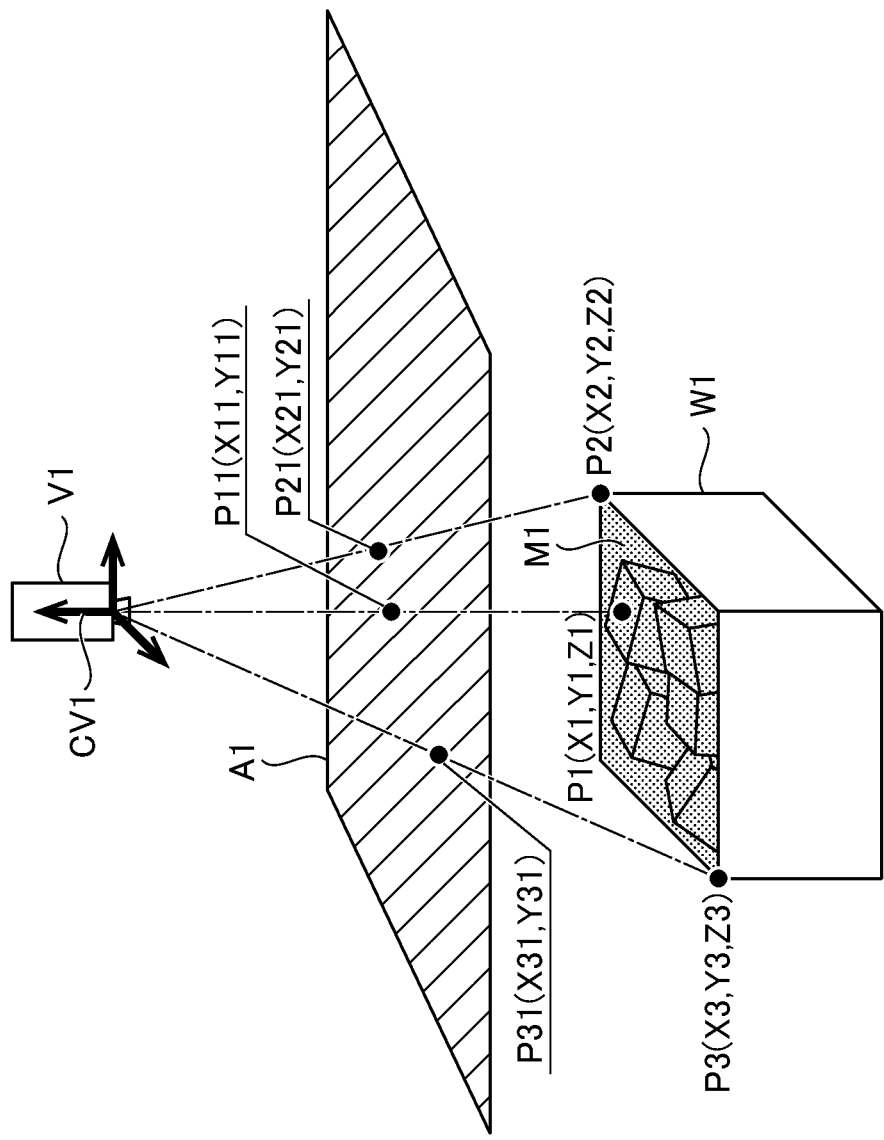
FIG. 8 is a diagram showing processing of determining a visual sensor model position as an arrangement position of the visual sensor model.
Figure 9:
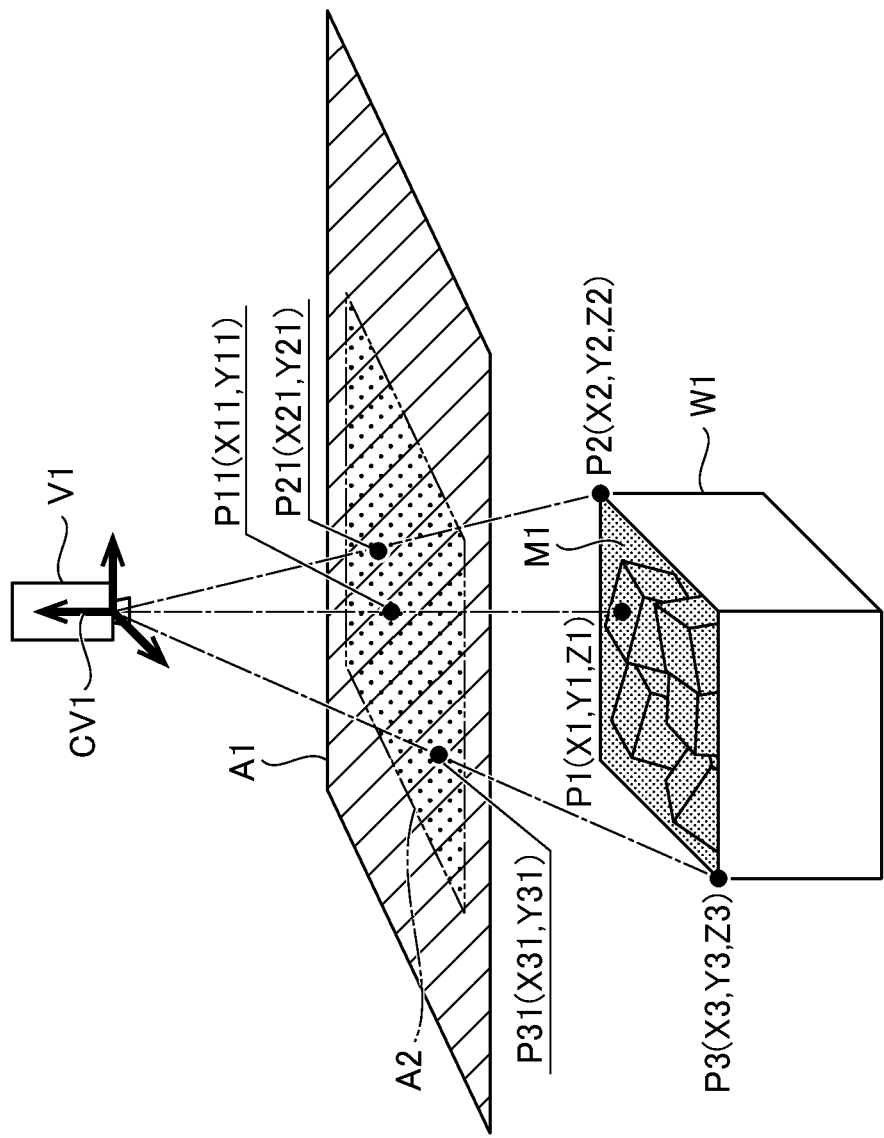
FIG. 9 is a diagram showing processing of determining a visual sensor model position as an arrangement position of the visual sensor model.

FIGS. 8 and 9 are diagrams showing processing of determining the visual sensor model position as the arrangement position of the visual sensor model V1. As shown in FIGS. 8 and 9, at the visual sensor model position of the visual sensor model V1, the position conversion unit 119 converts the three-dimensional positions P1 (X1, Y1, Z1), P2 (X2, Y2, Z2), and P3 (X3, Y3, Z3) of the measurement point M1 into two-dimensional positions P11 (X11, Y11), P21 (X21, Y21), and P31 (X31, Y31), respectively.

In the examples shown in FIGS. 8 and 9, the position conversion unit 119 converts the three three-dimensional positions P1, P2, and P3 into two-dimensional positions P11, P21, and P31, respectively, but the number of three-dimensional positions is not limited thereto.

The position determination unit 120 determines whether the converted two-dimensional positions P11, P21, and P31 are included in the image size A1 of the visual sensor model V1. In the example shown in FIG. 8, the position determination unit 120 determines that all the converted two-dimensional positions P11, P21, and P31 are included in the image size A1 of the visual sensor model V1.

Then, the position determination unit 120 determines the visual sensor model position where all the two-dimensional positions P11, P21, and P31 are included in the image size A1 of the visual sensor model V1 as the arrangement position of the visual sensor model V1.

Here, when there are a plurality of positions of the visual sensor model in which all of the two-dimensional positions P11, P21, and P31 are included in the image size A1 of the visual sensor model V1, the position determination unit 120 determines a position at which the measurement point M1 appears the largest in the image of the visual sensor model V1 as an arrangement position of the visual sensor model V1.

Further, as shown in FIG. 9, the imaging area designation unit 116 designates an imaging area A2 in which the measurement point M1 is imaged by the visual sensor model V1 within the image size A1 of the visual sensor model V1. When the measurement point M1 is imaged so as to be included in the imaging area A2 narrower than the image size A1 of the visual sensor model V1, the position determination unit 120 determines the visual sensor model position in which all of the two-dimensional positions P11, P21, and P31 are included in the imaging area A2 of the visual sensor model V1 as the arrangement position of the visual sensor model V1.

Figure 10:
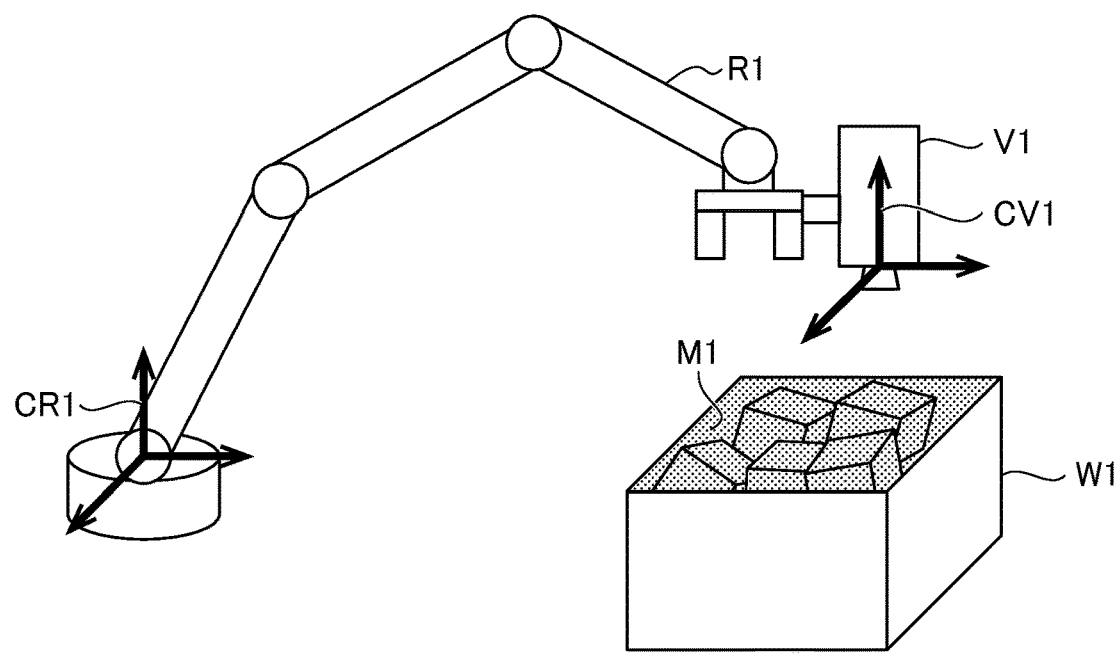
FIG. 10 is a diagram showing an example in which a visual sensor model is attached to a robot model.

FIG. 10 shows an example in which the visual sensor model V1 is attached to the robot model R1. As shown in FIG. 10, when the visual sensor model V1 is attached to the tip of the arm of the robot model R1, the robot posture calculation unit 121 calculates the posture of the robot model R1 at the arrangement position of the visual sensor model V1.

Then, using the robot model R1, the visual sensor model V1, and the measurement object model W1 described above, the simulation execution unit 122 executes a simulation in which the robot model R1 performs an operation on the measurement object model W1 based on the operation program.

Second Embodiment

FIGS. 11 to 19 are diagrams showing processing of the simulation device 1 according to a second embodiment. The second embodiment differs from the first embodiment in that a measurement point M2 of a measurement object model W2 has a three-dimensional shape.

Figure 11:
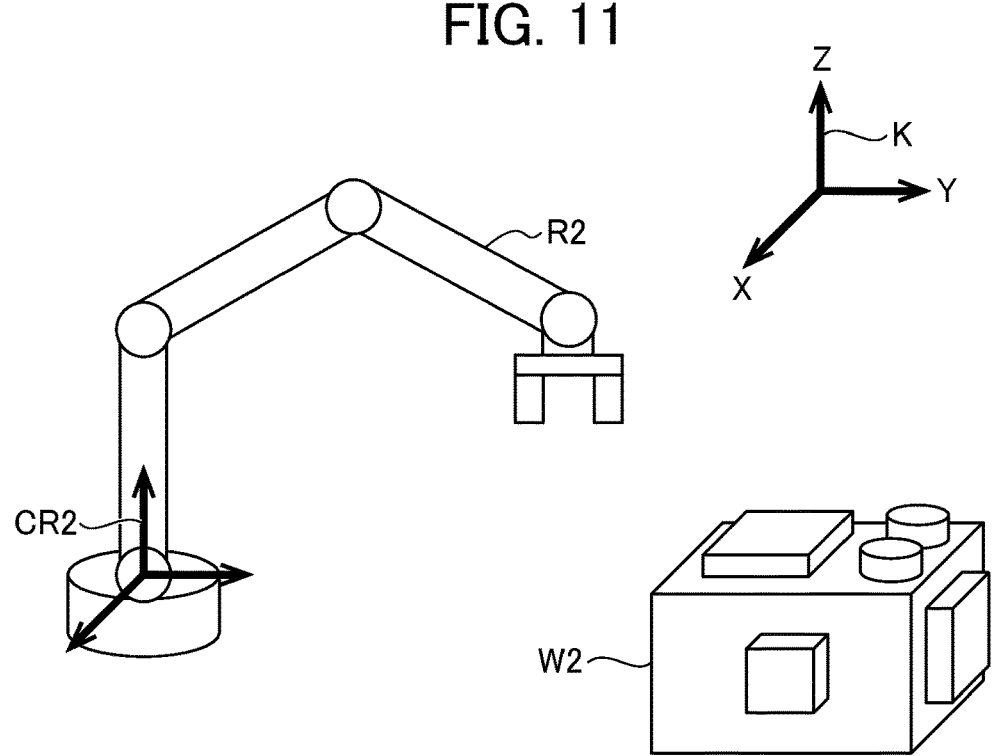
FIG. 11 is a diagram showing a robot model, a visual sensor model, and a measurement object model in a virtual space according to a second embodiment.

FIG. 11 is a diagram showing a robot model R2, a visual sensor model V2, and a measurement object model W2 in a virtual space according to the second embodiment. As shown in FIG. 11, the virtual space creation unit 111 creates a virtual space representing a work space three-dimensionally. Then, the measurement object model arrangement unit 112 arranges the measurement object model W2 representing the measurement object three-dimensionally in the virtual space. The measurement object model W2 may be, for example, a workpiece including a three-dimensional shape such as a plurality of rectangular parallelepipeds and cylinders. The reference coordinate system K represents a coordinate system serving as a reference in the virtual space.

Further, the robot model arrangement unit 113 arranges the robot model R2 representing the robot three-dimensionally in the virtual space. The robot model coordinate system CR2 represents a coordinate system of the robot model R2. The robot model R2 may be, for example, a multi-joint robot.

Figure 12:
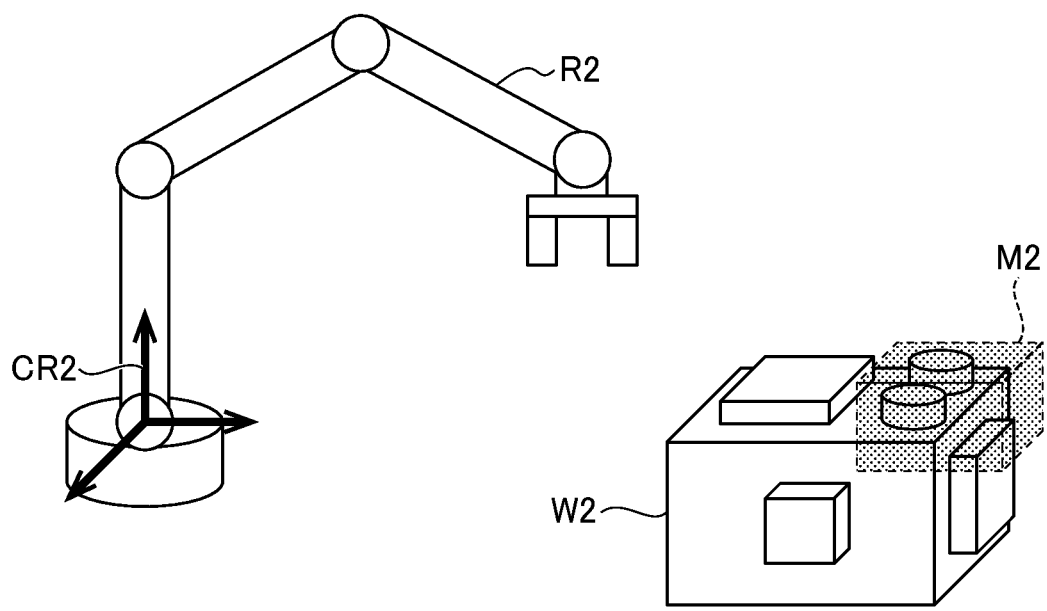
FIG. 12 is a diagram showing processing of designating a measurement point.

FIG. 12 is a diagram showing processing of designating a measurement point M2. As shown in FIG. 12, the measurement point designation unit 114 designates a measurement point M2 in the measurement object model W2. In the example shown in FIG. 12, the measurement point designation unit 114 designates all or a portion of the measurement object model W2 as the measurement point M2.

The measurement point designation unit 114 designates the measurement point M2 by, for example, surrounding all or a portion of the measurement object model W2 with a rectangular parallelepiped.

Figure 13:
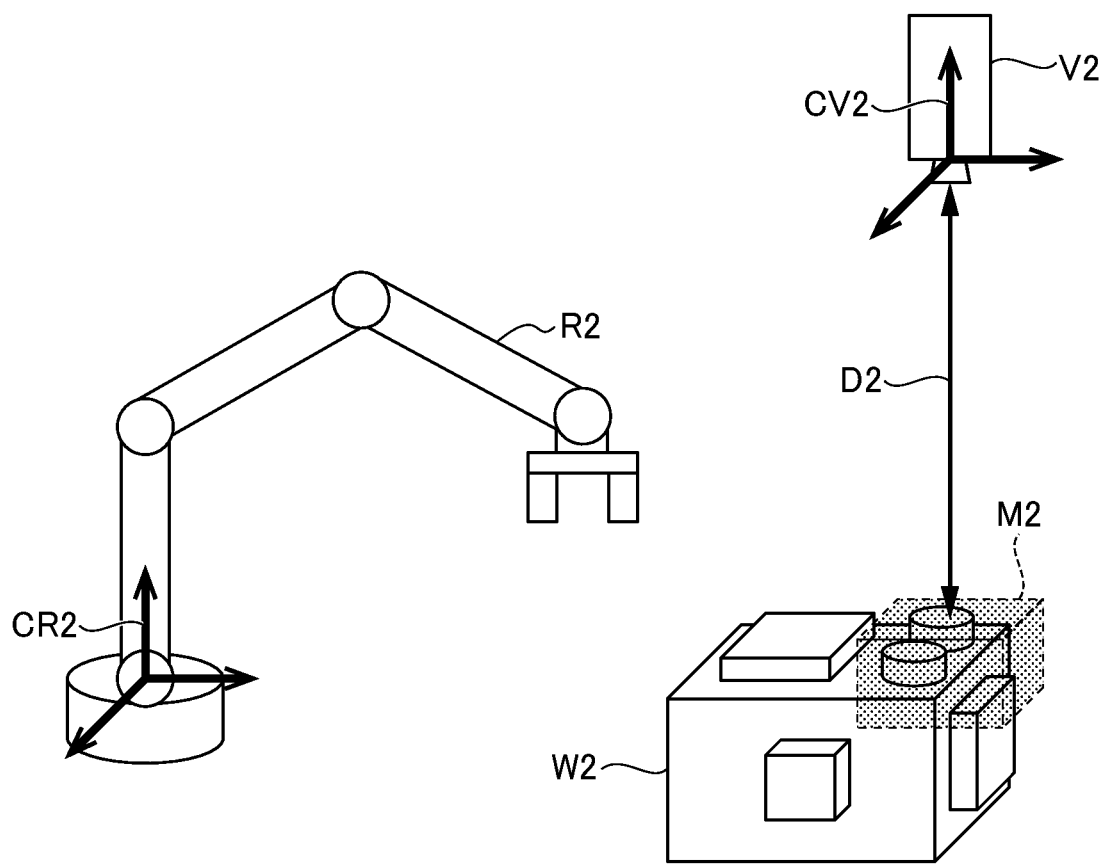
FIG. 13 is a diagram showing processing of arranging a visual sensor model.

FIG. 13 is a diagram showing processing of arranging the visual sensor model V2. As shown in FIG. 13, the visual sensor model arrangement unit 115 arranges the visual sensor model V2 at one or more arbitrary visual sensor model positions above the measurement point M2.

The distance designation unit 118 designates a distance D2 between the visual sensor model V2 and the measurement point M2. For example, the distance designation unit 118 designates a fixed distance or designates a range of distances in accordance with an operation of the operation unit 14, thereby designating the distance D2.

Figure 14:
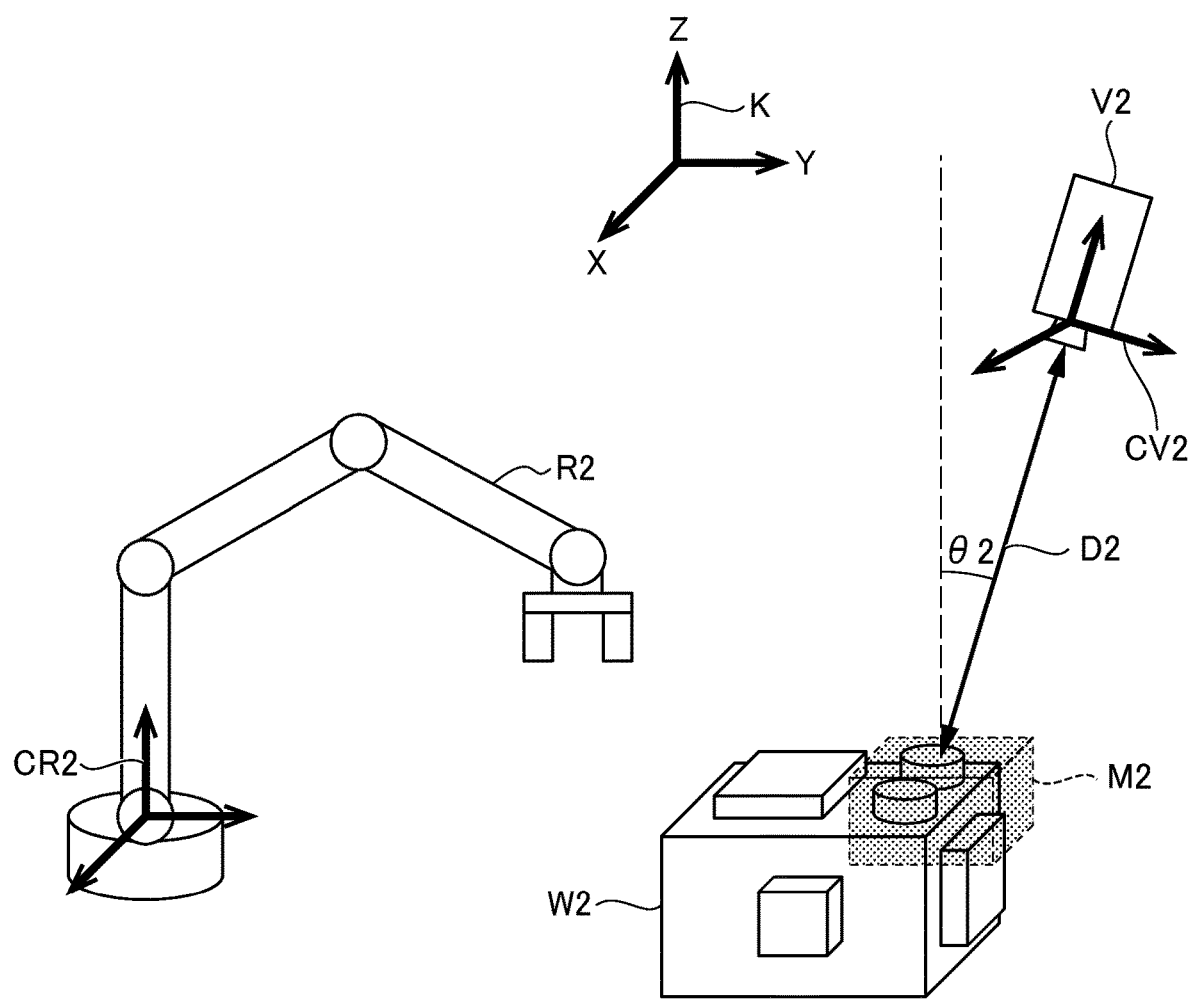
FIG. 14 is a diagram showing processing of designating the posture of the visual sensor model.

FIG. 14 is a diagram showing processing of designating the posture of the visual sensor model V2. As shown in FIG. 14, the sensor posture designation unit 117 designates a posture when the visual sensor model V2 is disposed above the measurement point M2.

Specifically, the sensor posture designation unit 117 designates the angle θ2 around the visual sensor model coordinate system CV2 based on the posture in which the optical axis of the visual sensor model V2 is perpendicular to the reference plane of the virtual space (for example, the XY plane of the virtual space) (that is, the posture of the visual sensor model V2 in FIG. 13). The processing of designating the posture of the visual sensor model V2 may be omitted when it is not necessary to designate the posture of the visual sensor model V2.

Figure 15:
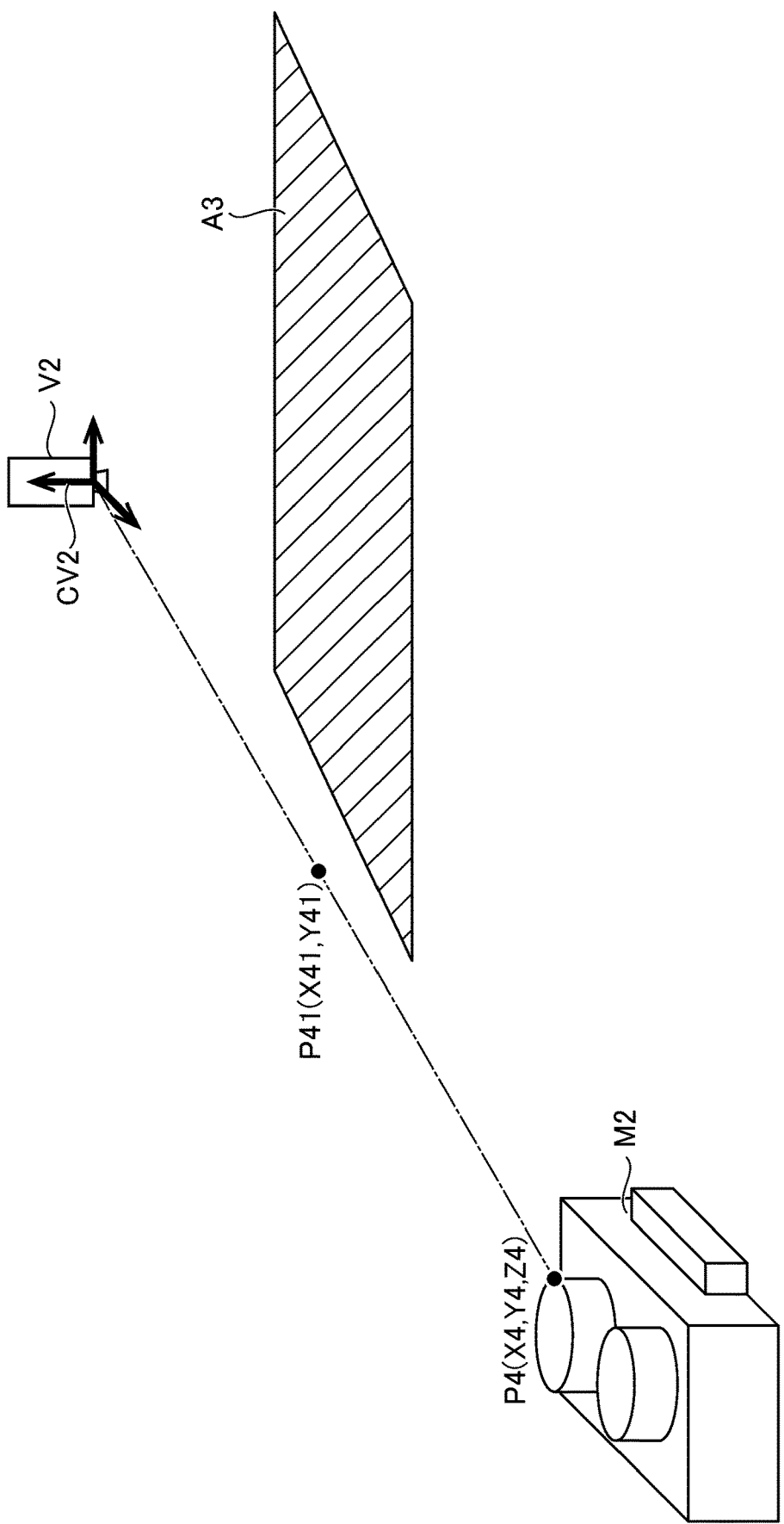
FIG. 15 is a diagram showing processing of converting a three-dimensional position of a measurement point into a two-dimensional position.
Figure 16:
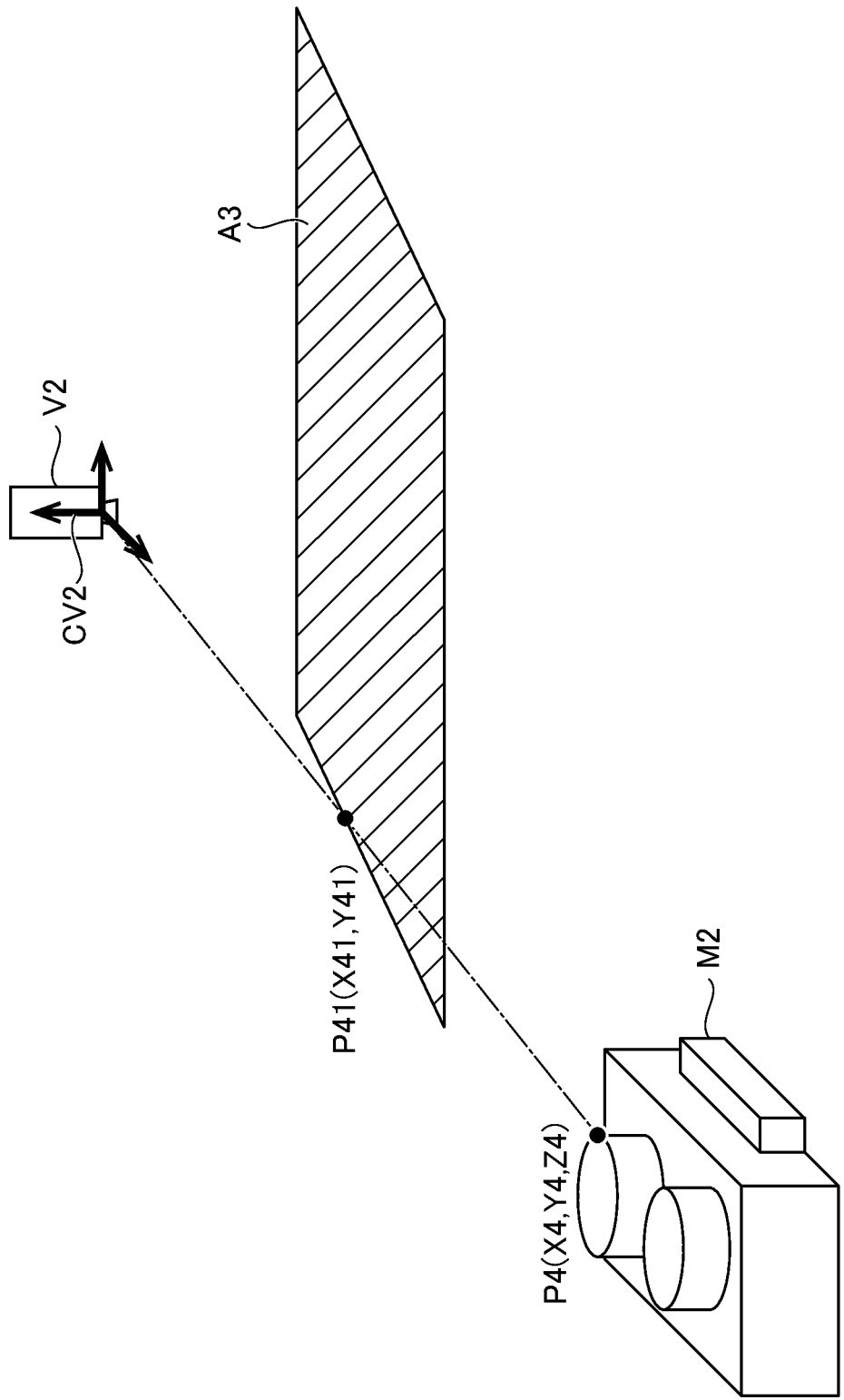
FIG. 16 is a diagram showing processing of converting a three-dimensional position of a measurement point into a two-dimensional position.

FIGS. 15 and 16 are diagrams showing processing of converting the three-dimensional position P4 of the measurement point M2 into a two-dimensional position P41. As shown in FIGS. 15 and 16, the three-dimensional position P4 of the measurement point M2 is represented as coordinates (X4, Y4, Z4) in the reference coordinate system K in the virtual space.

Then, the position conversion unit 119 converts the three-dimensional position P4 (X4, Y4, Z4) of the measurement point M2 at the visual sensor model position of the visual sensor model V2 into the two-dimensional position P41 (X41, Y41) when the measurement point M1 is imaged by the visual sensor model V1.

Specifically, the position conversion unit 119 converts the three-dimensional position P4 of the measurement point into the two-dimensional position P41 when the measurement point is imaged by the visual sensor model V2, using the imaging conditions including the visual sensor model position of the visual sensor model V2, the focal length of the lens of the visual sensor model V2, the length per pixel of the imaging element of the visual sensor model V2, and the center position of the lens of the visual sensor model V2. The imaging conditions may include other conditions relating to the visual sensor model V2.

When the visual sensor model position of the visual sensor model V2 is changed to an arbitrary position by the visual sensor model arrangement unit 115, the position conversion unit 119 converts the three-dimensional position P4 (X4, Y4, Z4) of the measurement point into the two-dimensional position P41 (X41, Y41) at the changed visual sensor model position.

That is, the simulation device 1 repeats the conversion of the three-dimensional position P4 into the two-dimensional position P41 by the position conversion unit 119, while changing the visual sensor model position arranged by the visual sensor model arrangement unit 115 in response to an input operation performed by the user on the operation unit 14.

Further, as shown in FIGS. 15 and 16, the position determination unit 120 determines whether the converted two-dimensional position P41 is included in the image size A3 of the visual sensor model V2. In the example shown in FIG. 15, the position determination unit 120 determines that the converted two-dimensional position P41 is not included in the image size A3 of the visual sensor model V2. On the other hand, in the example shown in FIG. 16, the position determination unit 120 determines that the converted two-dimensional position P41 is included in the image size A3 of the visual sensor model V2.

Figure 17:
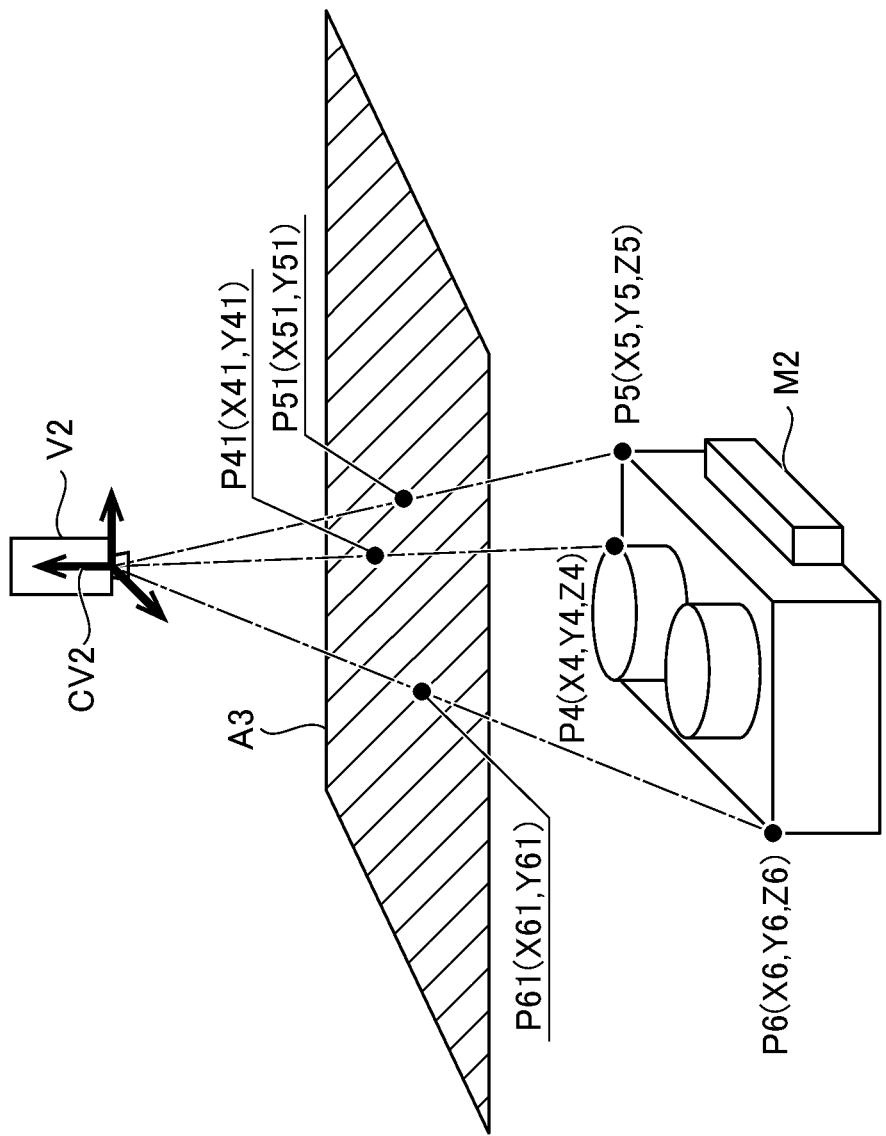
FIG. 17 is a diagram showing processing of determining a visual sensor model position as an arrangement position of the visual sensor model.
Figure 18:
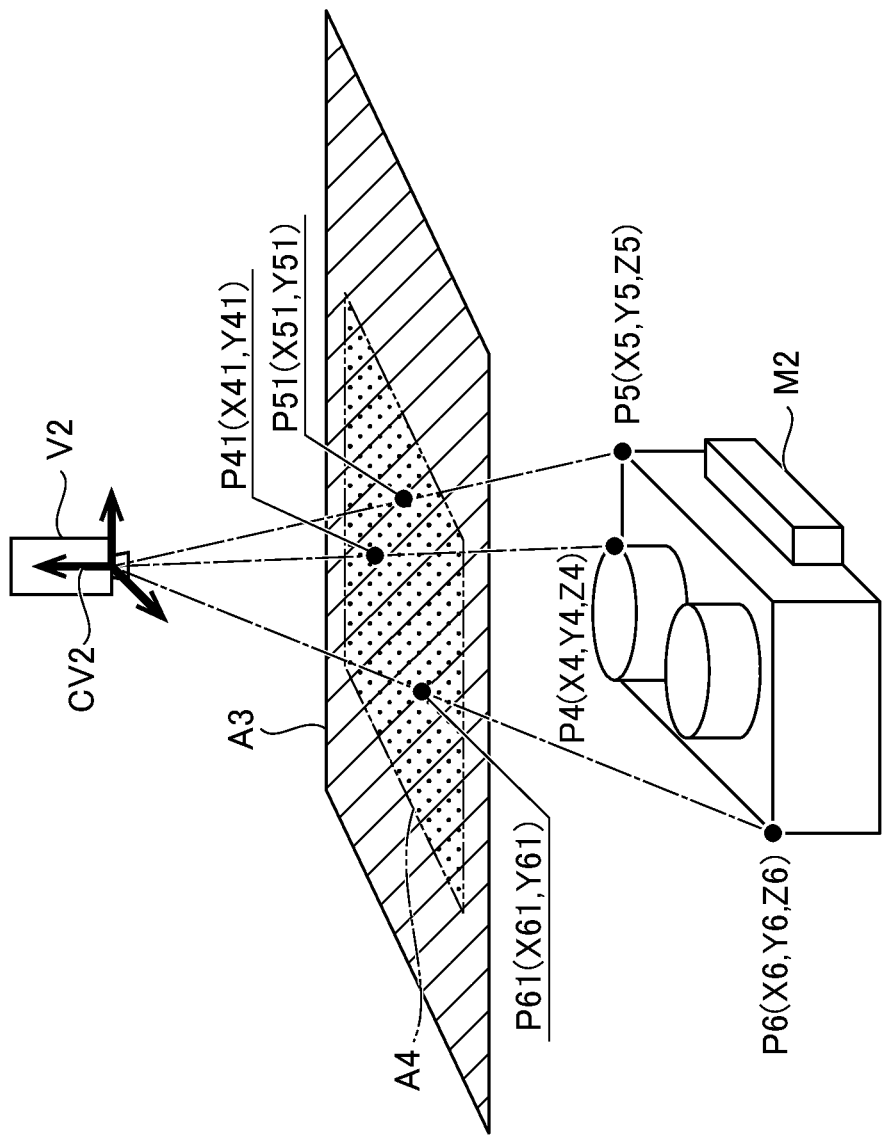
FIG. 18 is a diagram showing processing of determining a visual sensor model position as an arrangement position of the visual sensor model.

FIGS. 17 and 18 are diagrams showing processing of determining the visual sensor model position as the arrangement position of the visual sensor model V2. As shown in FIGS. 17 and 18, at the visual sensor model position of the visual sensor model V2, the position conversion unit 119 converts the three-dimensional positions P4 (X4, Y4, Z4), P5 (X5, Y5, Z5) and P6 (X6, Y6, Z6) of the measurement point M2 into two-dimensional positions P41 (X41, Y41), P51 (X51, Y51) and P61 (X61, Y61), respectively.

In the examples shown in FIGS. 17 and 18, the position conversion unit 119 converts the three three-dimensional positions P4, P5, and P6 into two-dimensional positions P41, P51, and P61, respectively, but the number of three-dimensional positions is not limited thereto.

The position determination unit 120 determines whether the converted two-dimensional positions P41, P51, and P61 are included in the image size A3 of the visual sensor model V2. In the example shown in FIG. 17, the position determination unit 120 determines that all the converted two-dimensional positions P41, P51, and P61 are included in the image size A3 of the visual sensor model V2.

Then, the position determination unit 120 determines the visual sensor model position where all of the two-dimensional positions P41, P51, and P61 are included in the image size A3 of the visual sensor model V2 as the arrangement position of the visual sensor model V2.

Here, when there are a plurality of positions of the visual sensor model in which all of the two-dimensional positions P41, P51, and P61 are included in the image size A3 of the visual sensor model V2, the position determination unit 120 determines a position at which the measurement point M2 appears the largest in the image of the visual sensor model V2 as an arrangement position of the visual sensor model V2.

Further, as shown in FIG. 18, the imaging area designation unit 116 designates an imaging area A4 in which the measurement point M2 is imaged by the visual sensor model V2 within the image size A3 of the visual sensor model V2.

When the measurement point M2 is imaged so as to be included in the imaging area A4 narrower than the image size A3 of the visual sensor model V2, the position determination unit 120 determines the visual sensor model position in which all of the two-dimensional positions P41, P51, and P61 are included in the imaging area A4 of the visual sensor model V2 as the arrangement position of the visual sensor model V2.

Figure 19:
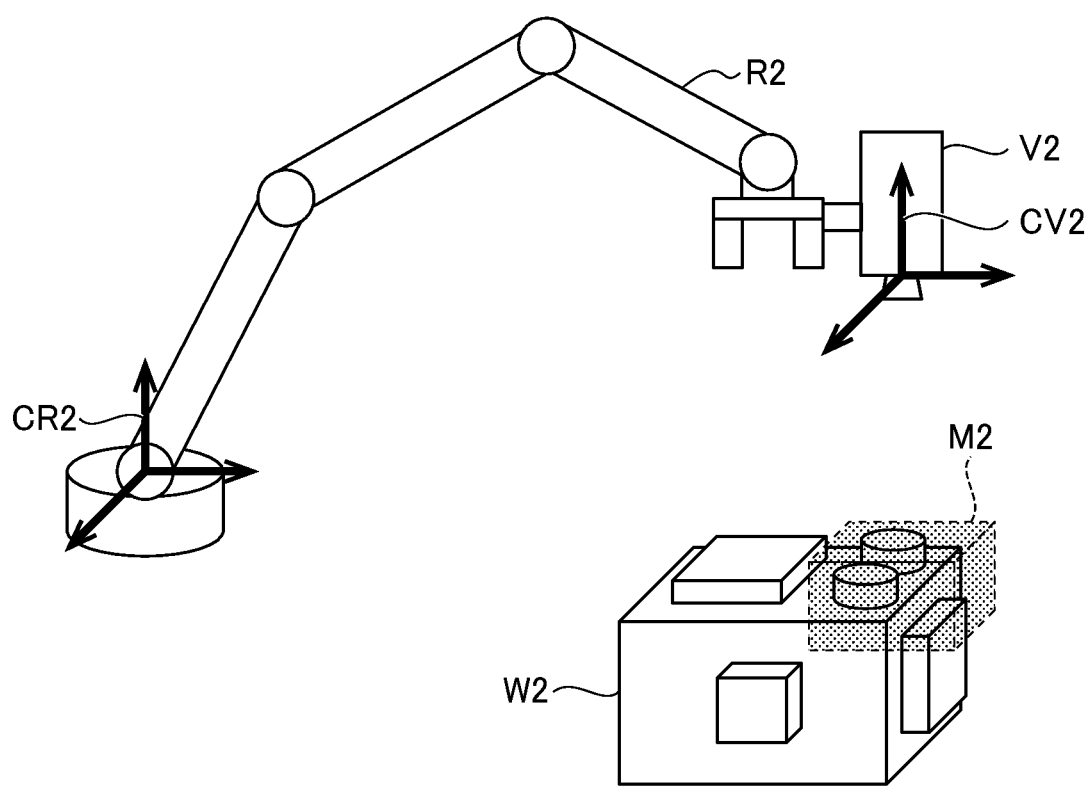
FIG. 19 is a diagram showing an example in which a visual sensor model is attached to a robot model.

FIG. 19 is a diagram showing an example in which the visual sensor model V2 is attached to the robot model R2. As shown in FIG. 19, when the visual sensor model V2 is attached to the tip of the arm of the robot model R2, the robot posture calculation unit 121 calculates the posture of the robot model R2 at the arrangement position of the visual sensor model V2.

Then, using the robot model R2, the visual sensor model V2, and the measurement object model W2 described above, the simulation execution unit 122 executes a simulation in which the robot model R2 performs an operation on the measurement object model W2 based on the operation program.

[Flow of Processing]

FIG. 20 is a flowchart showing the flow of processing of the simulation device 1 common to the first and second embodiments. In Step S1, the virtual space creation unit 111 creates a virtual space representing a work space three-dimensionally.

In Step S2, the measurement object model arrangement unit 112 arranges a measurement object model representing the measurement object three-dimensionally in the virtual space. The robot model arrangement unit 113 arranges a robot model representing a robot three-dimensionally in the virtual space.

In Step S3, the measurement point designation unit 114 designates one or more measurement points in the measurement object model. The visual sensor model arrangement unit 115 arranges a visual sensor model representing three-dimensionally a visual sensor for imaging a measurement object, at one or more arbitrary visual sensor model positions above the measurement point.

In Step S4, the position conversion unit 119 converts the three-dimensional position of the measurement point at the visual sensor model position into a two-dimensional position when the measurement point is imaged by the visual sensor model.

In Step S5, the position determination unit 120 determines the visual sensor model position where all of the two-dimensional positions are included in the image size of the visual sensor model as the arrangement position of the visual sensor model.

OTHER EMBODIMENTS

Further, the simulation device 1 according to another embodiment may include a control unit 11 that executes the following functions in accordance with an operator's operation. In other words, the control unit 11 designates one or more measurement points in a measurement object model representing a measurement object three-dimensionally in a virtual space representing a work space three-dimensionally.

Next, the control unit 11 receives an input operation for arranging a visual sensor model representing a visual sensor for imaging a measurement object three-dimensionally at one or more arbitrary visual sensor model positions above the measurement point.

Further, the control unit 11 receives an input operation for determining the visual sensor model position included in the image size of the visual sensor model as the arrangement position of the visual sensor model. With such a configuration, it is possible for the simulation device 1 according to the other embodiment to execute the processing described in the first and second embodiments.

According to the embodiment described above, the simulation device 1 includes: the virtual space creation unit 111 for creating a virtual space representing a work space three-dimensionally; the measurement object model arrangement unit 112 for arranging a measurement object model representing a measurement object three-dimensionally in the virtual space; the measurement point designation unit 114 for designating a measurement point in the measurement object model; the visual sensor model arrangement unit 115 for arranging a visual sensor model representing a visual sensor for imaging the measurement object three-dimensionally at an arbitrary visual sensor model position; and the position determination unit 120 for determining the visual sensor model position included in the image size of the visual sensor model as the arrangement position of the visual sensor model based on the position of the measurement point.

With such a configuration, it is possible for the simulation device 1 to automatically determine the position of the visual sensor model, reduce the labor and time of adjusting the position of the visual sensor model, and efficiently adjust the position of the visual sensor model.

Further, the simulation device 1 further includes the position conversion unit 119 that converts the three-dimensional position of the measurement point into the two-dimensional position when the measurement point is imaged by the visual sensor model in the visual sensor model position, and the position determination unit 120 determines the visual sensor model position in which all of the two-dimensional positions are included in the image size of the visual sensor model as the arrangement position of the visual sensor model. With such a configuration, it is possible for the simulation device 1 to automatically determine the visual sensor model position at which the measurement point can be appropriately imaged as the arrangement position of the visual sensor model.

In addition, the simulation device 1 further includes the robot model arrangement unit 113 for arranging a robot model representing a robot three-dimensionally in a virtual space, and the robot posture calculation unit 121 for calculating a posture of the robot model at an arrangement position of the visual sensor model when the visual sensor model is attached to the robot model. With such a configuration, it is possible for the simulation device 1 to calculate the posture of the robot model using the visual sensor model position at which the measurement point can be appropriately imaged.

The simulation device 1 further includes the imaging area designation unit 116 for designating an imaging area in which a measurement point is imaged by the visual sensor model within the image size of the visual sensor model. With such a configuration, it is possible for the simulation device 1 to designate a desired imaging area and appropriately image a measurement point.

The simulation device 1 further includes the sensor posture designation unit 117 for designating a posture when the visual sensor model is arranged above the measurement point. With such a configuration, it is possible for the simulation device 1 to designate the posture of a desired visual sensor model and appropriately image a measurement point.

The simulation device 1 further includes the distance designation unit 118 for designating a distance between the visual sensor model and the measurement point. With such a configuration, it is possible for the simulation device 1 to designate a distance between a desired visual sensor model and a measurement point and appropriately image the measurement point.

The sensor posture designation unit 117 designates an angle around the coordinate system of the visual sensor model based on the posture in which the optical axis of the visual sensor model becomes perpendicular to the reference plane of the virtual space. With such a configuration, it is possible for the simulation device 1 to appropriately image a measurement point by designating an angle of a desired visual sensor model.

Further, when there are a plurality of positions of the visual sensor model in which all of the two-dimensional positions are included in the image size of the visual sensor model, the position determination unit 120 determines a position at which the measurement point appears the largest in the image of the visual sensor model as the arrangement position of the visual sensor model. With such a configuration, it is possible for the simulation device 1 to automatically determine the most appropriate visual sensor model position as the arrangement position of the visual sensor model.

Further, the position conversion unit 119 converts the three-dimensional position of the measurement point into a two-dimensional position when the measurement point is imaged by the visual sensor model, using imaging conditions including the visual sensor model position of the visual sensor model, the focal length of the lens of the visual sensor model, the length per pixel of the imaging element of the visual sensor model, and the center position of the lens of the visual sensor model. With such a configuration, it is possible for the simulation device 1 to convert the three-dimensional position of the measurement point to a two-dimensional position.

In addition, the control unit 11 designates one or more measurement points in a measurement object model representing a measurement object three-dimensionally in a virtual space representing a work space three-dimensionally. Next, the control unit 11 receives an input operation for arranging a visual sensor model representing a visual sensor for imaging a measurement object three-dimensionally at one or more arbitrary visual sensor model positions above the measurement point. Further, the control unit 11 receives an input operation for determining the visual sensor model position included in the image size of the visual sensor model as the arrangement position of the visual sensor model.

With such a configuration, it is possible for the simulation device 1 to automatically determine the position of the visual sensor model, reduce the labor and time of adjusting the position of the visual sensor model, and efficiently adjust the position of the visual sensor model.

Although embodiments of the present invention have been described above, the robot 1 can be implemented by hardware, software, or a combination thereof. The control method performed by the robot 1 can also be implemented by hardware, software, or a combination thereof. Here, "implemented by software" indicates that it is realized by a computer reading and executing a program.

The program may be stored and provided to a computer using various types of non-transitory computer-readable media (non-transitory computer readable medium). Non-transitory computer-readable media includes various types of tangible storage media. Examples of non-transitory computer-readable media include magnetic recording media (e.g., hard disk drives), magneto-optical recording media (e.g., magneto-optical disks), CD-ROM (Read Only Memory), CD-R, CD-R/W, semiconductor memory (for example, mask ROM, PROM (Programmable ROM), EPROM (Erasable PROM), flash ROM, and RAM (random access memory).

Although the above-described embodiments are preferred embodiments of the present invention, the scope of the present invention is not limited to the above-described embodiments, and various modifications can be made without departing from the gist of the present invention.

EXPLANATION OF REFERENCE NUMERALS

1 simulation device
11 control unit
12 storage unit
13 display unit
14 operation unit
111 virtual space creation unit
112 measurement object model arrangement unit
113 robot model arrangement unit
114 measurement position designation unit
115 visual sensor model arrangement unit
116 imaging area designation unit
117 sensor posture designation unit
118 distance designation unit
119 position conversion unit
120 position determination unit
121 robot posture calculation unit
122 simulation execution unit

The invention claimed is:

1. A simulation device comprising:
a virtual space creation unit that creates a virtual space representing a work space three-dimensionally;
a measurement object model arrangement unit that arranges a measurement object model representing a measurement object three-dimensionally in the virtual space;
a measurement point designation unit that designates a measurement point in the measurement object model;
a visual sensor model arrangement unit that arranges a visual sensor model representing three-dimensionally a visual sensor that images the measurement object, at an arbitrary visual sensor model position; and
a position determination unit that determines the visual sensor model position included in an image size of the visual sensor model as an arrangement position of the visual sensor model based on a position of the measurement point; and
a position conversion unit that converts a three-dimensional position of the measurement point in the visual sensor model position into a two-dimensional position when the measurement point is imaged by the visual sensor model,
wherein the position determination unit determines the visual sensor model position where all of two-dimensional positions are included in an image size of the visual sensor model as an arrangement position of the visual sensor model.

2. The simulation device according to claim 1, further comprising:
a robot model arrangement unit that arranges a robot model representing a robot three-dimensionally in the virtual space; and
a robot posture calculation unit that calculates a posture of the robot model at an arrangement position of the virtual sensor model when the visual sensor model is attached to the robot model.

3. The simulation device according to claim 1, further comprising an imaging area designation unit that designates an imaging area in which the measurement point is imaged by the visual sensor model within the image size of the visual sensor model.

4. The simulation device according to claim 1, further comprising a sensor posture designation unit that designates a posture when the visual sensor model is disposed above the measurement point.

5. The simulation device according to claim 4, wherein the sensor posture designation unit designates an angle around a coordinate system of the visual sensor model based on a posture in which an optical axis of the visual sensor model is perpendicular to a reference plane of the virtual space.

6. The simulation device according to claim 1, further comprising a distance designation unit that designates a distance between the visual sensor model and the measurement point.

7. The simulation device according to claim 1, wherein the position determination unit determines a position at which the measurement point appears largest in the image of the visual sensor model as an arrangement position of the visual sensor model when there are a plurality of positions of the visual sensor model in which all of the two-dimensional positions are included in the image size of the visual sensor model.

8. The simulation device according to claim 1, wherein the position conversion unit converts a three-dimensional position of the measurement point into a two-dimensional position when a measurement point is imaged by the visual sensor model, using imaging conditions including a visual sensor model position of the visual sensor model, a focal length of a lens of the visual sensor model, a length per pixel of an imaging element of the visual sensor model, and a center position of the lens of the visual sensor model.

9. A simulation device comprising a control unit configured to perform:
designating a measurement point in a measurement object model representing an object three-dimensionally in a virtual space representing a work space three-dimensionally;
receiving an input operation for arranging a visual sensor model representing a visual sensor for imaging the measurement object three-dimensionally at an arbitrary visual sensor model position;
receiving an input operation for determining the visual sensor model position included in an image size of the visual sensor model as an arrangement position of the visual sensor model;
converting a three-dimensional position of the measurement point in the visual sensor model position into a two-dimensional position when the measurement point is imaged by the visual sensor model; and
determining the visual sensor model position where all of two-dimensional positions are included in an image size of the visual sensor model as an arrangement position of the visual sensor model.

10. A simulation device comprising:
a virtual space creation unit that creates a virtual space representing a work space three-dimensionally;
a measurement object model arrangement unit that arranges a measurement object model representing a measurement object three-dimensionally in the virtual space;
a measurement point designation unit that designates a measurement point in the measurement object model;
a visual sensor model arrangement unit that arranges a visual sensor model representing three-dimensionally a visual sensor that images the measurement object, at an arbitrary visual sensor model position;
a position determination unit that determines the visual sensor model position included in an image size of the visual sensor model as an arrangement position of the visual sensor model based on a position of the measurement point; and
an imaging area designation unit that designates an imaging area in which the measurement point is imaged by the visual sensor model within the image size of the visual sensor model.

\* \* \* \* \*